No. 872,021. PATENTED NOV. 26, 1907.
D. W. SHIEK.
COMPUTING MACHINE.
APPLICATION FILED JAN. 11, 1906.

No. 872,021. PATENTED NOV. 26, 1907.
D. W. SHIEK.
COMPUTING MACHINE.
APPLICATION FILED JAN. 11, 1906.

Witnesses:

Inventor:
Daniel W. Shiek
By Hill & Hill
Attys.

No. 872,021. PATENTED NOV. 26, 1907.
D. W. SHIEK.
COMPUTING MACHINE.
APPLICATION FILED JAN. 11, 1906.

Witnesses:

Inventor:
Daniel W. Shiek
By Hill & Hill
Attys.

No. 872,021. PATENTED NOV. 26, 1907.
D. W. SHIEK.
COMPUTING MACHINE.
APPLICATION FILED JAN. 11, 1906.

Witnesses:

Inventor:
Daniel W. Shiek
By Hill & Hill
Attys.

UNITED STATES PATENT OFFICE.

DANIEL W. SHIEK, OF CHICAGO, ILLINOIS, ASSIGNOR OF ONE-HALF TO WALTER L. MILLIKEN, OF INDIANAPOLIS, INDIANA.

COMPUTING-MACHINE.

No. 872,021.     Specification of Letters Patent.     Patented Nov. 26, 1907.

Application filed January 11, 1906. Serial No. 295,670.

*To all whom it may concern:*

Be it known that I, DANIEL W. SHIEK, a citizen of the United States, residing at Chicago, in the county of Cook and State of Illinois, have invented certain new and useful Improvements in Computing-Machines, of which the following is a description.

My invention belongs to the general class of computing or adding machines, in which by the operation of keys, the usual simple computations may be indicated by mechanical means coöperating with the keys.

The object of my invention is to produce a simple, durable and accurate machine for the purpose described, that may be easily manipulated with a minimum expenditure of energy.

To this end my invention consists in the novel construction, arrangement and combination of parts herein shown and described, and more particularly pointed out in the claims.

In the drawings, wherein like reference characters indicate like or corresponding parts, Fig. 3 is the same view showing the position of the coöperating parts with a key depressed.

Figure 8:
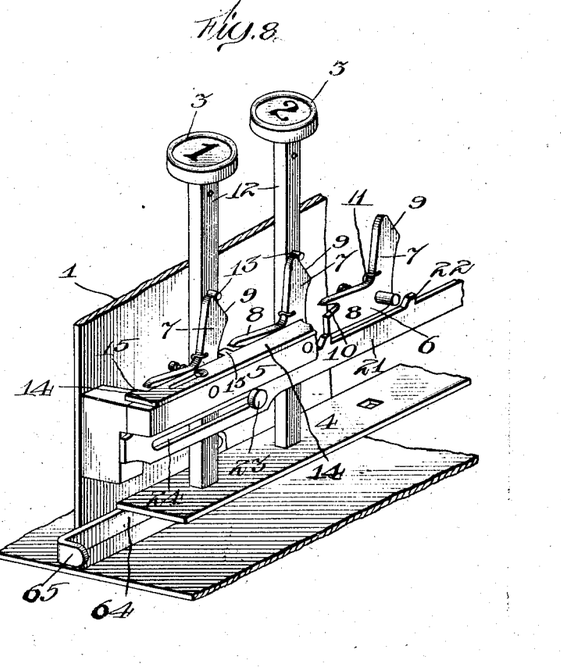
Fig. 8 is a fragmentary perspective view showing the key and stop construction.
Figure 9:
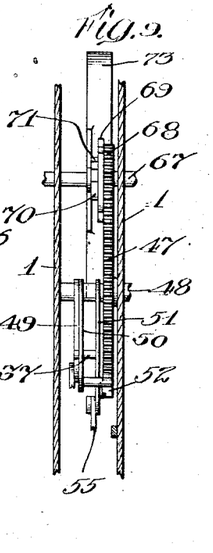
Fig. 9 is a transverse section of one of the parts controlling a single section of one of the numerical orders above the units order, taken on line 9—9 of Fig. 6, parts being omitted to prevent confusion.
Figure 10:
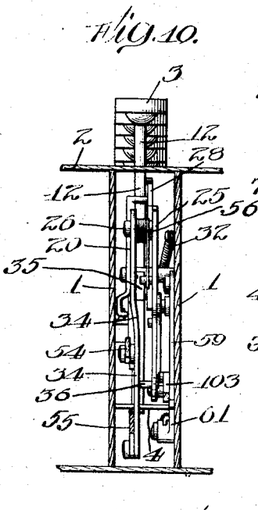
Fig. 10 is a similar section on line 10—10 of Fig. 6, also with parts omitted.

In the preferred form shown in the drawings, 1 is a suitable frame provided with a key board 2 and a section of keys 3, 3, for each numerical order within the capacity of the machine. The keys are longitudinally movable and are guided at their lower ends by a plate 4 through which they loosely extend. The shanks 12 of the keys are square or otherwise formed to prevent their turning in their guides. Below the keys is positioned a horizontal bar 5, carrying a series of bell crank levers 6, or equivalent parts, pivotally connected at the angle of the arms to the bar. (Fig. 8.) One end of the levers, as 7, is substantially vertical while the other 8, extends in a horizontal direction. The arm 7 is provided with a cam face 9, while the free end of the arm 8 is notched, forked or equivalently formed at 10 for a purpose to be described. A spring 11 tends to maintain the levers 6 in their normal position. The number of bell crank levers in each series corresponds to the number of keys in each numerical section there being a key for each numeral from 1 to 9 inclusive. Each key shank 12 is provided with a pin 13 or other part so positioned that in the operation of the key the pin will contact with the cam face 9 and rock the coöperating bell crank lever 6 on its pivotal support.

A bar 14 slidingly mounted on the bar 5 is provided with a pin or projection 15 for each lever 6 normally registering with the notch or groove 10 in the end of the arm 8. A lever 16, pivotally supported upon the frame between its ends, as at 17, at its lower end engages the sliding bar 14. As shown the end of the lever is slotted at 18 and loosely engages a pin 19 on the bar 14. The upper end of the lever 16 is inclined or cam faced as at 20, to be operated by the contact of a movable part therewith as hereinafter described.

A longitudinally movable bar 21 is positioned below and in the same vertical plane with the bell crank levers 6. The said bar is provided with a series of shoulders or stops 22 or equivalent means, corresponding to the number of levers 6, regularly positioned to gradually increase the allowed travel of the bar from the shortest to the longest distances regulated by the position of the keys 1 to 9 respectively. That is to say, the distance traveled by the bar 21 depends upon the particular key operated, and is regularly increased from the first to the ninth keys inclusive. As shown the bar 21 is supported upon the frame by pins 23 loosely positioned in slots 24 in the bar, permitting the necessary movement.

Figure 4:
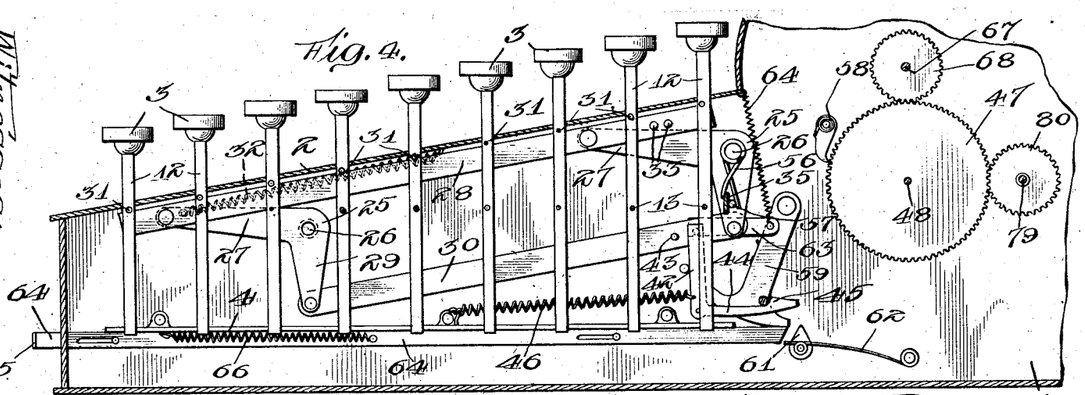
Fig. 4 is a view similar to Fig. 2, with parts removed to more clearly show the key connection with certain coöperating parts.
Figure 5:
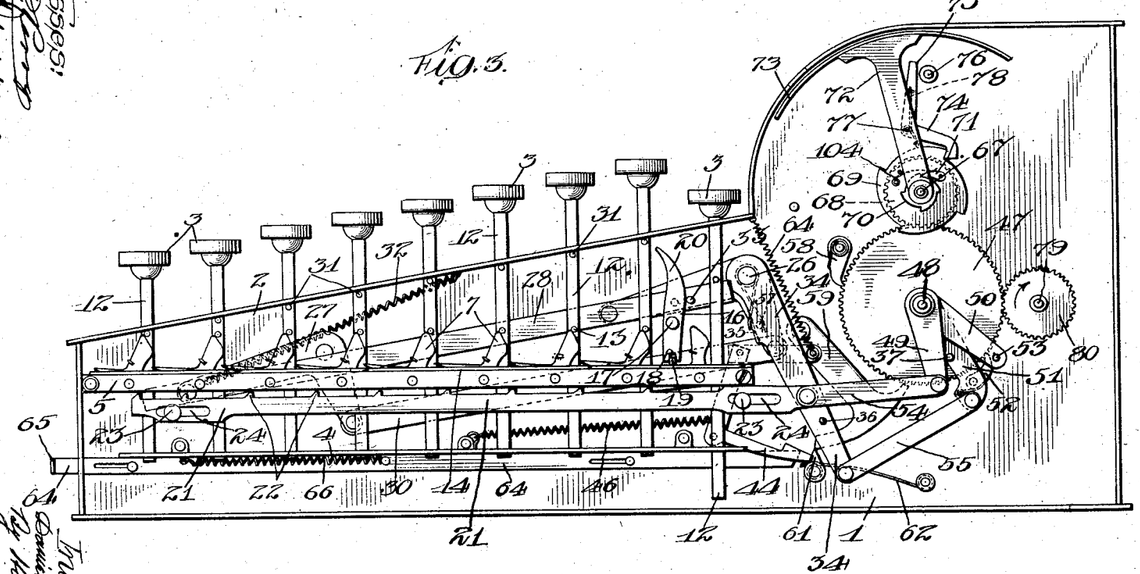
Fig. 5 is the same view showing the position of the parts with a key depressed.

Two similarly formed bell crank levers 25, 25, are pivotally supported near their angles upon pivots 26, (Figs. 4 and 5). The corresponding arms 27, 27, carry a connecting bar 28 pivotally connected thereto, while the arms 29, 29, carry a similar bar 30. Any transverse or downward movement of the bar 28 will thus be transmitted to the bar 30, which will also be given a longitudinal movement by reason of the swinging of its supporting arms 29 on their pivotal supports. The bar 28 is also given a longitudinal movement in the opposite direction at the same time. Each key stem or shank 12 is provided with a pin 31 extending horizontally just above the upper bar 28, so that as a key is depressed the pin engages the upper side of the bar, which is thus also depressed, operating the connected bar 30 and associated parts. A spring 32 connected to one of the arms 27 of one of the bell crank levers 25, and to a fixed part of the machine or equivalent means serves to return the several parts including the key to their normal positions, when unrestrained. The bar 28 also carries a pair of projecting pins 33—33, suitably spaced from one another, and positioned to engage the opposite sides of the cam 20 on the lever 16. As the bar 28 is depressed by a key, therefore, the upper end of the lever actuated by the cam and pin engagement and aided by the longitudinal movement of the bar 28 is thrown forward, while the lower end is forced in the opposite direction longitudinally moving the sliding bar 14. Upon the initial movement of a key therefore, the pin 13 engages the cam 9 of the bell crank lever 6, coöperating with that particular key oscillating the lever to a point that will bring the upper surface of the arm below the horizontal plane of the projection 15 on the bar 14. The pin 31 on the shank of the key at the same time contacts with the top of the bar 28 depressing the same. There is sufficient clearance between the engaging pins 33—33 and the cam 20 of the lever 16, however, to permit the described movement of the bell crank lever 6 of the key operated, before the bar 14 is moved. After the lever 6 is in proper position, further movement of the key operates the lever 16 longitudinally moving the bar 14. The projection 15 on the bar coöperating with the particular key operated passes above the top of the arm 8, while the several other projections 15 engage the notches 10 in the end of the arms 8 of the other levers 6, effectually locking them in such position and preventing the operation of another key until the key previously operated has been released, and it, together with all the associated parts, again assumes its normal position. The operated key continues on its downward movement carrying the bar 28 and simultaneously operating the bar 30 and its associated and coöperating parts, as will be hereafter described.

Figure 2:
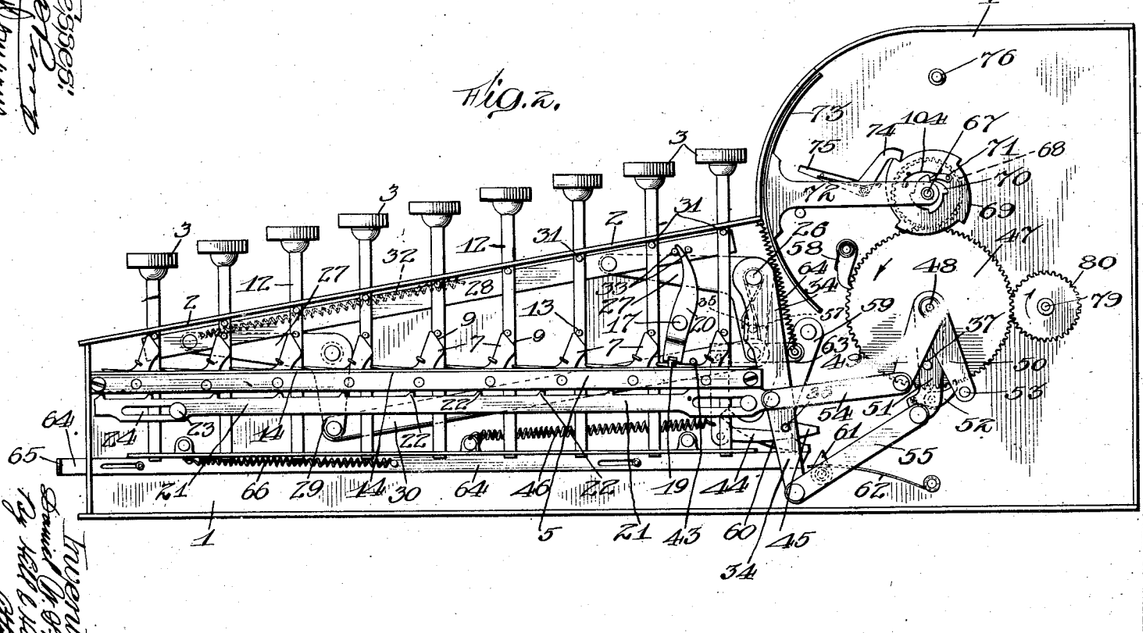
Fig. 2 is a side elevation of the same with the side casing removed to show the construction.
Figure 18:
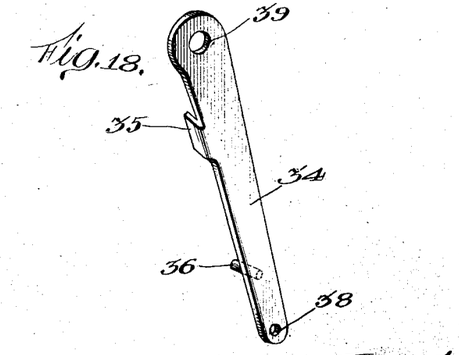

An oscillating bar 34 is pivoted at one end upon the rear pivot 26 with its free end extending downwardly as shown. The said bar is provided with two rearward extensions 35, and 36 see Fig. 18, and is constructed to pivotally engage another part at its free end 38. A bell crank lever 40 is pivotally connected to a fixed part of the machine near its angle as at 41, with one arm 42 extending upward in the path of travel of a pin or projection 43 on the bar 30, and the other arm 44 substantially horizontally extended and provided with a latch 45 constructed to engage the extension 36 on the bar 34 and retain the same in its normal position. A spring 46 extending from the arm 42 to a fixed part of the device tends to return the latch to its normal position, (Figs. 2 and 4).

Figure 16:
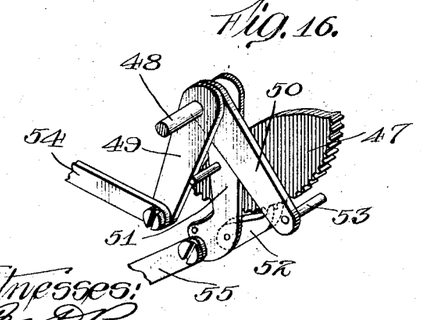
Figure 17:
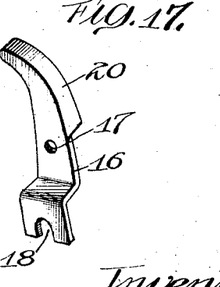

A gear or cog-wheel 47 is loosely mounted on a shaft 48 to the rear of the lever 34, and a bell crank lever 49—50 as well as a pawl bar 51 are also loosely mounted upon the same shaft. The free end of the bar 51 is provided with a spring pawl 52 engaging the periphery of the cog-wheel. The arm 50 is provided with a pin 53 extending transversely across the plane of the cog-wheel, in proximity to the pawl 52, (Figs. 2, 3 and 16). The end of the stop bar 21 is connected by a link 54 to the end of the arm 49. A second link 55 connects the free end of the oscillating bar 34 with the free end of the pawl lever 51. The said lever carries a pin 37 or equivalent means, positioned between the bell crank lever arms 49—50 so that on the return of the oscillating bar to its normal position, the pin 37 will contact with the arm 49 and carry it and the stop bar 21 back to their normal positions. It is obvious that as described the gear or cog-wheel 47 in addition to its function as a driving gear also serves as a ratchet wheel in its coöperation with the actuating pawl 52. It is also clear that if preferred a ratchet wheel may be so mounted as to rotate with and thus actuate the gear 47, the pawl 52 engaging the said ratchet wheel. For the purpose of economizing space and dispensing with unnecessary parts, however, the form shown is preferred, the gear 47 having both functions, the form suggested in which both gear and ratchet wheel are employed, for the purposes here contemplated being considered merely an inferior equivalent. Hence where in the claims I refer to a driving member, I wish to be understood as including either form mentioned.

A coiled spring 56 is loosely mounted on the rear pivotal shaft 26, with its ends extended and crossed with one end positioned in front of the extension 35 of the bar 34 and the other in the rear of a lateral pin 57 on the bell crank arm 29. It will thus be seen that upon depressing a key as before explained, the arm 29 of the rear bell crank lever 25 will be swung backward on its pivot, the pin 57 contacts with one end of the spring 56 tending to swing the spring rearward. The latch 45 however, firmly holds the oscillating arm 34 in its normal position and since the other end of the spring 56 is positioned in front of the extension 35 on the arm, the forcing forward of the arm 29 necessarily tensions the spring since one end is fixed and the other forced rearward. When the parts have reached proper positions, the stop 43 on the bar 30 contacts with the arm 42 of the latch lever 40, swinging the same forward on its pivotal support, and disengaging the latch 45 from the catch 36, when the tension on the spring 56 swings the arm 34 with its connected parts rearward a distance dependent upon the allowed movement of the connected stop bar 21, which, as before explained, depends upon the particular key operated. This movement first moves the pawl 52 forward slightly until it contacts with the pin 53, at which point the bell crank 49—50 and the arm 51 moves together. This positive engagement of the pawl with the cog-wheel and the movement of the levers rotate the cog-wheel 47 the fixed distance permitted, at which point it is brought to a positive stop by the wedging action of the pawl between the periphery of the cog-wheel and the pin 53. This action effectually precludes any possible overthrow of the parts caused by striking the keys too quickly or with too much force. Upon releasing the key the spring 32 as well as the several other springs on the coöperative parts serves to promptly return all the parts to their normal position. A pawl 58 engaging the cog-wheel 47 prevents backward rotation thereof and the cog-wheel is thus held at the exact point of rotation permitted by the particular key operated. By this means the cog-wheel is progressively rotated in one direction only by the successive operation of the keys.

It has been already pointed out that when one key is operated, no other key in the same section or numerical order can be operated until the key operated has returned to its normal position. To insure accuracy, it is also desirable that when a key is initially depressed or operated, it cannot return to its normal position until the stroke is completed or special steps are taken to release it. Any preferred means may be employed for this purpose. As shown in the drawings an oscillating bar 59 is pivotally connected at one end to the frame and is provided with a ratchet segment 60 on its free end. A coöperating double acting pawl 61 is arranged to engage the ratchet segment to prevent a reverse movement until the segment has reached its limit of movement in either direction. A spring 62 resiliently maintains the pawl in operative position. A link 63 connects the bar with the operating bar 30, so that a slight movement of any key in the section will operate the ratchet segment and prevent the release of the key until it completes its full stroke. The segment is of a suitable length to escape from the pawl at either limit of movement. A spring 64 connected at one end to the bar 59 and at the other end to a fixed part of the machine, tends to return the arm to its normal position and lends its aid in returning all coöperating parts to their normal positions. If a key should be partially operated accidentally or a key not intended should be initially depressed, it is desirable to release it and thus reset the section for operation, without completing the stroke and thus causing an obvious error in the calculation. To accomplish this I prefer to position a sliding bar 64 in line with and with one end in proximity to the pawl 61, and the other end slightly extending from the front of the machine and preferably bent at a right angle as at 65 for convenience in operating the same. A spring 66, resiliently holds the bar in its normal position. By forcing the bar longitudinally, its inner end contacts with the pawl 61 and forces it out of operative position or out of engagement with the ratchet segment 60 when so engaged, permitting the various parts to return to their normal positions without affecting the registering mechanism.

Figure 6:
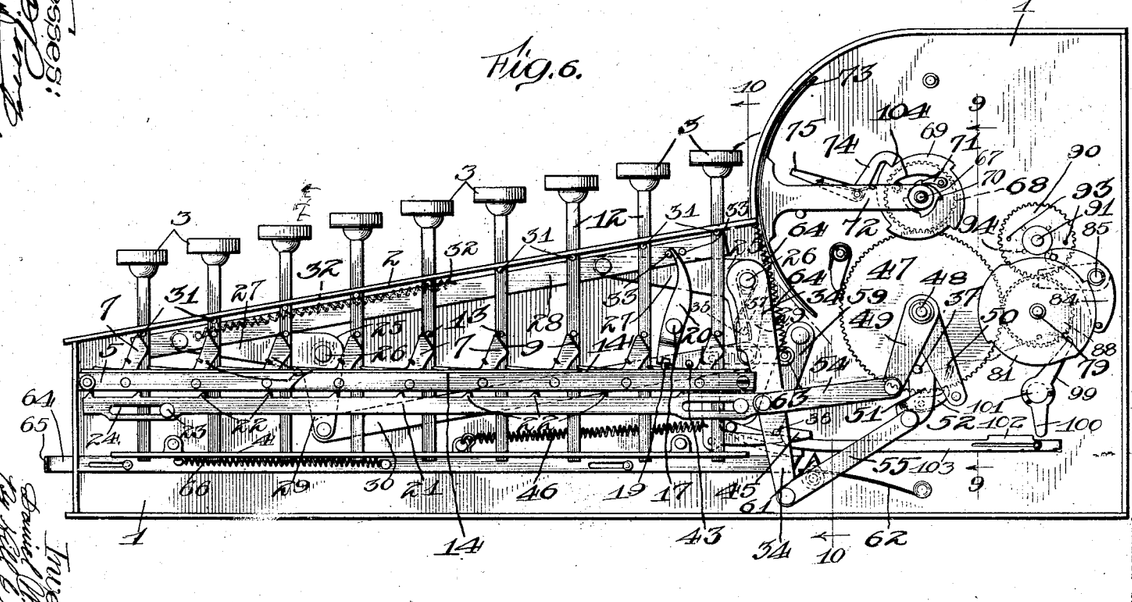
Fig. 6 is a longitudinal section showing the coöperating parts for a section of keys other than the first or units section.
Figure 7:
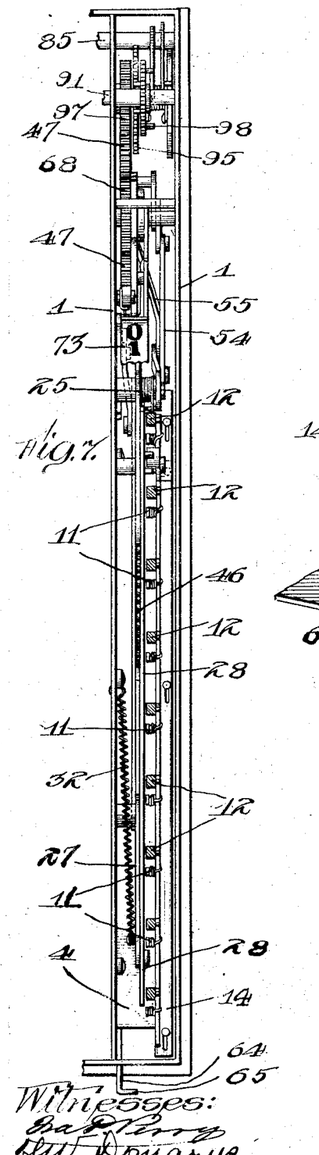
Fig. 7 is an inclined horizontal sectional view of one of the key numerical orders taken just below the upper casing.
Figures 19, 20:
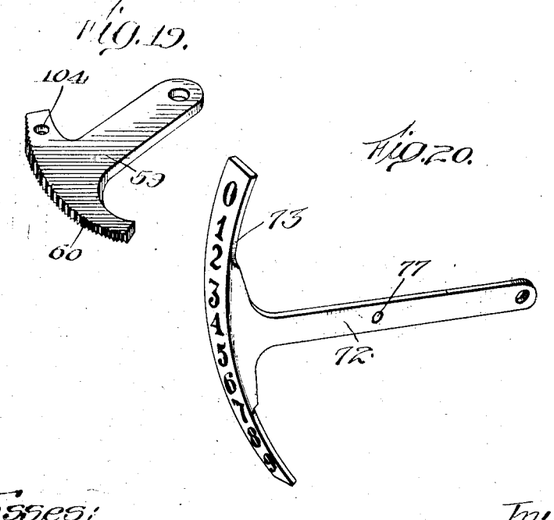

A shaft 67 loosely supported in the frame in proximity to the gear 47 has loosely mounted thereon a pinion 68, meshing with said gear 47. A ratchet wheel 69 is mounted to rotate with the pinion 68 and is preferably secured thereto. A second or resetting ratchet wheel 70 is fixedly mounted on the shaft in proximity to the ratchet wheel 69 in position to coöperate with a pawl 71 carried by the latter when the shaft is rotated to the right as shown in Figs. 2, 3 and 6. Next to said ratchet wheel 70 is an oscillating arm 72 loosely mounted on the shaft 67 carrying on its free end a numeral segment 73, provided on its face with the numerals 0 to 9 inclusive, (Fig. 20).

A trip pawl is mounted upon the oscillating arm 72 coöperating with the teeth on the ratchet wheel 69. In the preferred construction the pawl is substantially a bell crank lever in which one arm 74 provided with a hook extends in the path of the ratchet teeth while the other 75 is extended and when operated to its upper limit contacts with a projecting pin 76 or equivalent part and rocks the lever releasing the pawl from the ratchet tooth engaged. For this purpose the pawl is pivotally connected between its ends to the arm 72 as at 77. In the preferred construction resilient means are employed to insure the accurate operation of the pawl. As shown a spring 78 tends to maintain the pawl in operative position. The trip pin 76 is positioned to trip the pawl at the instant the indicator is advanced beyond the unit 9. Gravity, aided if desired by resilient means (not shown) causes the indicator to fall to its limit if unrestrained. The position of the ratchet wheel 69, however, may modify this as the pawl engages the next advancing tooth of the ratchet wheel limiting the fall of the indicator and displaying thereon the corresponding numeral. A shaft 79 has loosely mounted thereon a pinion 80 meshing with the large cog-wheel 47, (Figs. 2, 3, 4, 5, 13 and 15). In the form shown the pinion 68 as well as the pinion 80, is provided with forty teeth, the former for the purpose of operating the indicator arm four times at each complete revolution. The ratchet wheel 69 is equally divided or quartered by four teeth, and the movement of the various parts are regulated to permit the cog-wheel 47 to rotate at one operation to carry the pinion 68 forward to indicate not to exceed the nine numerals within the range of a single section of keys. The pinion 80 is employed to transmit the necessary movement in carrying as hereafter explained.

As thus explained the mechanism for the first section of keys, or the units section, applies to all, with the exception of the carrying mechanism, for the higher orders which will now be explained.

Figure 11:
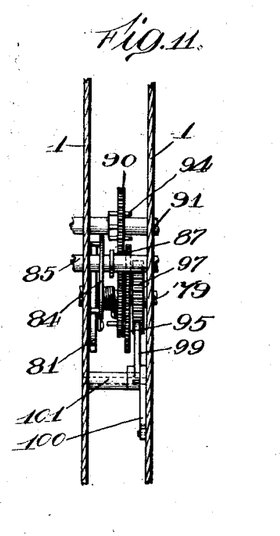
Fig. 11 is a rear view of the escapement mechanism employed in the carrying operation.
Figures 12, 14:
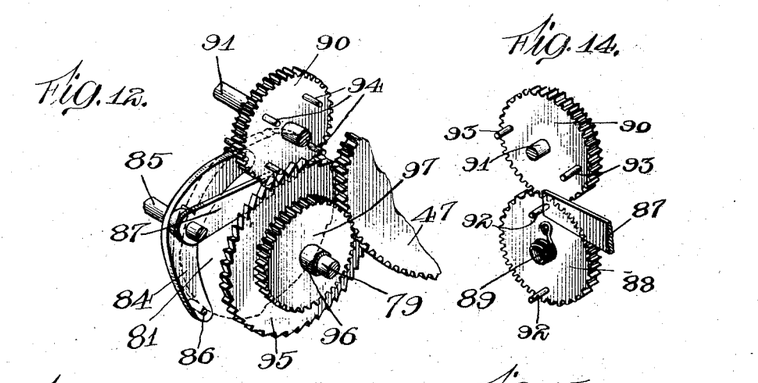
Fig. 12 is a partial perspective view of the same.
Figs. 13, 14, 15, 16, 17, 18, 19 and 20, are detail views.
Figure 13:
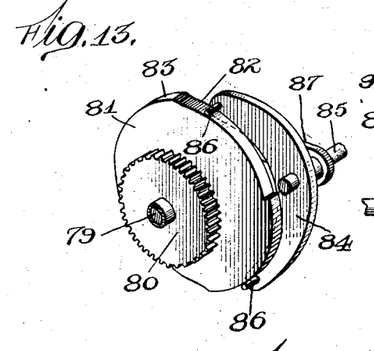
Figure 15:
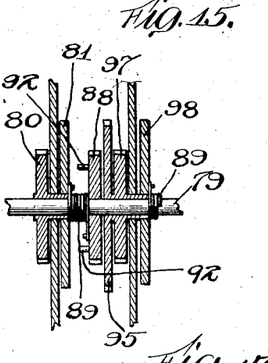

The pinion 80 carries therewith a cam 81, provided on its periphery with a cam face or planes 82 and 83 which are preferably segments of a circle with the shaft as a center, but varying in radii. This results in depressed faces 82 and raised faces 83, which are alternately brought into operative position. The faces are four in number in the form shown, of equal length and alternating in position. Near the cam is located a rocking lever 84 pivotally supported near its center on a shaft 85. The ends of the lever 84 are constructed and positioned to be alternately engaged by the cam faces 82 and 83 giving the lever a rocking motion, (Figs. 6, 12 and 13). As shown the lever 84 is provided near its ends with pins 86—86 extending across the periphery of the cam 81 and loosely engaged thereby. An escapement lever 87 is arranged to be oscillated by the lever 84. As shown the two are attached together giving the free end of the escapement lever a movement corresponding to and synchronous with the cam lever 84, (Figs. 12, 13 and 14). A pinion 88 is loosely mounted on the shaft 79 near the cam 81, the two being connected by a spring 89 loosely coiled about the shaft with one end secured to the cam and the other to the pinion forming a resilient connection between the two, (Figs. 11, 14 and 15). A pinion 90 loosely mounted upon a shaft 91 meshes with the pinion 88 their engagement preventing the operating of one without the other. The pinion 88 is provided with two pins 92—92 projecting from its face in line with the travel of the end of the escapement lever 87, while the pinion 90 is similarly provided with pins 93—93. The pins on each pinion are diametrically opposite to each other, and the line of direction from pin to pin of one pinion is at right angles to that of the other. The end of the escapement lever 87 will therefore alternately engage the pins on the two pinions, thus permitting the gradual advance of the part impelled by the spring 89, which is constantly tensioned by the rotation of the driven cam 81.

As clearly shown in Fig. 12, the opposite face of the pinion 90 is provided with four extending pins 94, equally spaced from each other and adapted to engage the teeth of a ratchet wheel 95 loosely mounted on the shaft 79. The ratchet wheel 95 is normally disengaged from said pins permitting the independent operation of the several parts when actuated by a key of that section, when the pinion 90 is rotated, however, one of the said pins 94 engages a ratchet tooth and the ratchet wheel and its associated parts including the indicator 72 and carrying pinion of that section are advanced one interval. Thus the gradual advance of the pinion 90 will be communicated by the ratchet wheel 95 to a sleeeve 96, upon which it is mounted and upon which is also mounted the pinion 97 and the cam 98 transmitting movement to the next higher order. The pinion 97, meshing with the main gear 47 of its section, together with the cam 98 of the orders above the units section correspond in construction, arrangement and operation to the pinion 80 and cam 81 heretofore described. Obviously in the units section the ratchet wheel 95 is not employed as the mechanism of that order receives no impulse from a lower order as is the case in the carrying operation to the higher orders. In all the sections except the first therefore, a ratchet wheel 95, pinion 97 and cam 98 are mounted to rotate together, and are driven by the engagement of a pinion 90 with the ratchet wheel as described, while the connection between the cam 81, or 98 as the case may be, with the pinion 88 of the next section is of a resilient nature.

In a device of this kind it is found desirable to slightly retard the carrying from the lower to a higher order, until the operative parts of the higher order have substantially completed their forward movement resulting from the simultaneous operation of a key of that order. In fact in some instances such action is essential in order to secure accuracy. As, for example, where keys in adjacent section are operated simultaneously, the carrying impulse from the lower order is liable to be nullified by the simultaneously moving parts of the higher order without registering the carrying impulse. Any preferred means may be employed for this purpose. In the form shown in the drawings each of the numerical orders above the units, is provided with a two part pawl 99—100, in which the part 99 has a movement in the plane of the pinion 88 in such manner that its free end may engage said pinion and temporarily prevent rotation thereof. The part 100 depends from the loose pivotal support 101 in line with the travel of a shouldered part 102 carried by a sliding link 103 connected to and operated by the ratchet arm 59 (Fig. 19) already described. The connection of the link to said arm, as shown is pivotal and at the point 104. The free end of the link is supported by a slot and pin connection as shown in Fig. 5. The parts 99 and 100 of the pawl have a limited movement upon one another so that during the initiatory movement of the link 103 the shoulder, which is as shown simply an elevated section of the link, contacts with the free end of the part 100 and swings the same the limited movement permitted before the part 99 is actuated to engage the periphery of the pinion 88. As the link completes its stroke the rear of the shoulder 102 passes by the end of the part 100 permitting the same to drop downward. The resilient tendency of the pinion 88 to rotate to actuate the carrying mechanism when not restrained by the escapement holds the pinion in engagement with the pawl until the reverse movement of the link 103 causes the shoulder 102 to contact with the opposite side of the part 100 and swing the same in the reverse direction. The engagement of the pawl 99 with the pinion 88 is maintained until the part 100 reaches its limit of movement on the part 99, at which point the continued movement of the link 103 positively disconnects said parts and permits the carrying impulse to actuate the higher order one interval as described. While the pinion 88 is locked against operation, however, the impulse caused by the operation of any key in the higher order, has been transmitted to the several parts and their operations fully completed before the pinion 88 is released and is free to perform its function.

Figure 1:
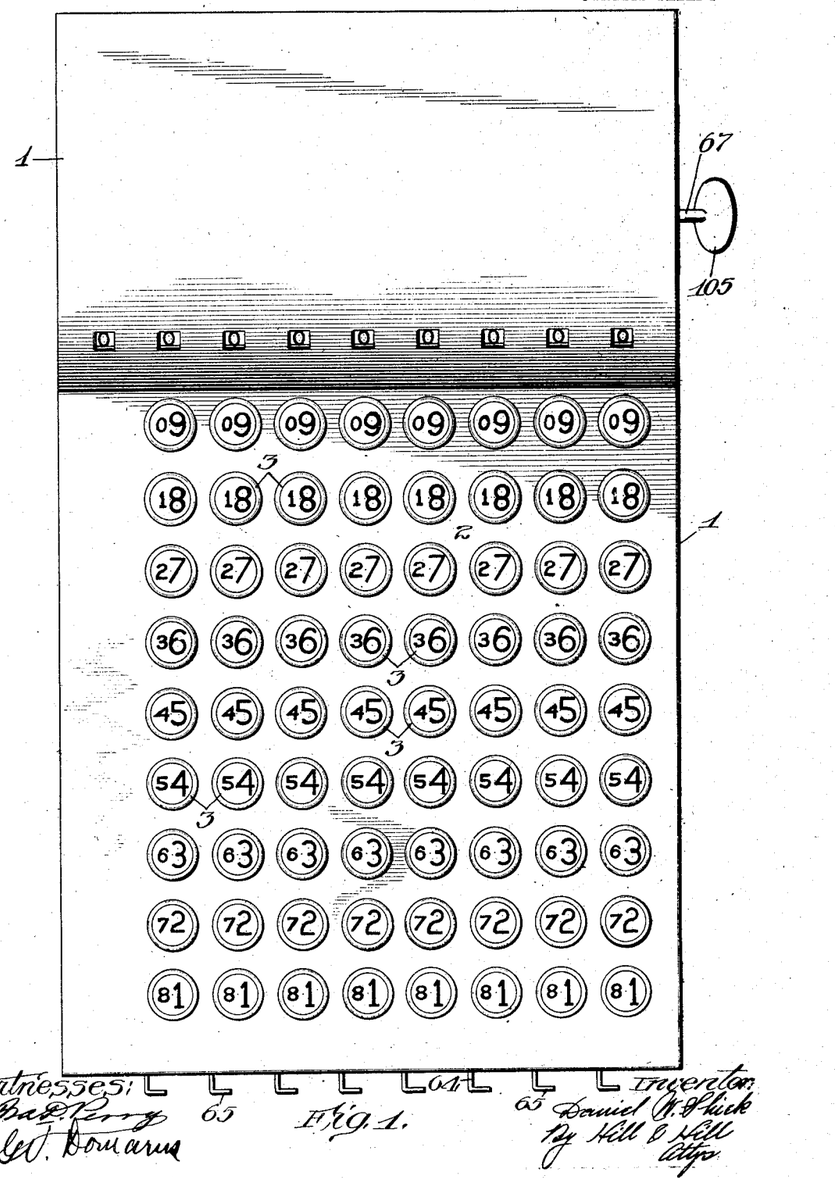
Figure 1 is a top plan of my improved device.

Referring now to the canceling or resetting means heretofore alluded to and shown in Figs. 2, 3 and 6, each order is provided with a ratchet wheel 70 fixed to the shaft 67 and adapted upon rotation of the shaft to engage a pawl 71 carried by the actuating pawl 69 of the oscillating indicator arm 72. A spring 104 or equivalent means, serves to insure the engagement of the pawl 71 with the ratchet wheel 70. The end of the shaft 67 protrudes from the frame (Fig. 1) and is provided with a knob 105 by means of which the shaft may be rotated actuating the several ratchet wheels 70 alined thereon. In their rotation the said ratchet wheels 70 will engage the several pawls 71 and hence the ratchet wheels 69, alining the several indicators, carrying the same upward until released when they will all indicate zero, canceling the computation previously indicated thereon and resetting them for the next computation.

Having thus described my invention what I claim as new, and desire to secure by Letters Patent is:—

1. In a device of the kind described, computing and indicating mechanism, and a plurality of series of controlling keys therefor, in combination with a pair of bell crank levers for each series, bars pivotally joining the corresponding ends of each pair of levers, means for transmitting the movement of each of the several keys in a series to one of said bars, and intermediate mechanism between the bars and the computing and indicating mechanism.

2. In a device of the kind described, computing and indicating mechanism, and a plurality of controlling keys therefor, in combination with a plurality of pairs of bell crank levers, bars pivotally joining the corresponding ends of each pair of levers, means for transmitting the movement of the keys to said bars, and resilient intermediate mechanism between the bars and the computing and indicating mechanism.

3. In a device of the kind described, computing and indicating mechanism, and a plurality of series of controlling keys therefor, in combination with a pair of bell crank levers for each series, means for transmitting the movement of each of the several keys in a series to one of said bars, intermediate mechanism between the bars and the computing and indicating mechanism, and means for returning said bell crank levers and their associated parts to their normal positions.

4. In a device of the kind described, computing and indicating mechanism, and a plurality of controlling keys therefor, in combination with a plurality of pairs of bell crank levers, bars pivotally connecting the corresponding ends of each pair of levers, means for transmitting the movement of the keys to said bars, intermediate mechanism between the bars and the computing and indicating mechanism, and resilient means for returning said bell cranks and their associated parts to their normal positions.

5. In a machine of the kind described, computing and indicating mechanism, a series of controlling keys therefor, and means for rendering all other keys in the series inoperative during the operation of any one of their number, in combination with a pair of bell crank levers, bars pivotally connecting the corresponding ends of the levers, means for transmitting the movement of each of the several keys to one of said bars, and intermediate mechanism between the bars and the computing and indicating mechanism.

6. In a machine of the kind described, computing and indicating mechanism, a series of controlling keys therefor, and means for rendering all other keys in the series inoperative during the operation of any one of their number, in combination with a pair of bell crank levers, bars pivotally connecting the corresponding ends of the levers, means for transmitting the movement of each of the several keys to one of said bars, intermediate mechanism between the bars and the computing and indicating mechanism, and means for returning said bell crank levers and their associated parts to their normal positions.

7. In a machine of the kind described, computing and indicating mechanism, a series of controlling keys therefor, means for rendering all other keys in the series inoperative during the operation of any one of their number, and means for locking the mechanism against reverse movement until an operated key has completed its stroke, in combination with a pair of bell crank levers, bars pivotally connecting the corresponding ends of the levers, means for transmitting the movement of each of the several keys to one of said bars, and intermediate mechanism between the bars and the computing and indicating mechanism.

8. In a machine of the kind described, computing and indicating mechanism, a series of controlling keys therefor, means for rendering all other keys in the series inoperative during the operation of any one of their number, and means for locking the mechanism against reverse movement until the operated key has completed its stroke, in combination with a pair of bell crank levers, bars pivotally connecting the corresponding ends of the levers, means for transmitting the movement of each of the several keys to one of said bars, intermediate mechanism between the bars and the computing and indicating mechanism, and means for returning the said bell crank levers and their associated parts to their normal positions after each operation.

9. A device of the kind described, comprising a plurality of numerical orders, each order provided with computing and indicating mechanism, a series of controlling keys therefor, and means for carrying from a lower to a higher order, in combination with a pair of bell crank levers, bars pivotally joining the corresponding ends of the levers, means for transmitting the movement of each of the several keys to one of said bars, and intermediate mechanism between the bars and the computing and indicating mechanism.

10. A device of the kind described, comprising a plurality of numerical orders, each numerical order being provided with computing and indicating mechanism, a series of controlling keys therefor, and means for carrying from a lower to a higher order, in combination with a pair of bell crank levers, bars pivotally joining the corresponding ends of the levers, means for transmitting the movement of each of the several keys in the series to one of said bars, intermediate mechanism between the bars and the computing and indicating mechanism, and means for returning said bell crank levers and their associated parts to their normal positions.

11. A device of the kind described, comprising a plurality of numerical orders, each order being provided with computing and indicating mechanism, a series of controlling keys therefor, and means for carrying from a lower to a higher order, in combination with a pair of bell crank levers, bars pivotally joining the corresponding ends of said levers, means for transmitting the movement of each of the several keys to one of said bars, and resilient intermediate mechanism between the bars and the computing and indicating mechanism.

12. A device of the kind described, consisting of a plurality of numerical orders, each order comprising computing and indicating mechanism, a series of controlling keys therefor, and means for carrying from a lower to a higher order, in combination with a pair of bell crank levers, bars pivotally joining the corresponding ends of the levers, means for transmitting the movement of any key of the series to one of said bars, resilient intermediate mechanism between the bars and the computing and indicating mechanism, and resilient means for returning said bell crank levers and their associated parts to their normal positions.

13. A device of the kind described, provided with a plurality of numerical orders, each order comprising computing and indicating mechanism, a series of controlling keys therefor, means for rendering all other keys in the series inoperative during the operation of any one of their number, and means for carrying from a lower to a higher order, in combination with a pair of bell crank levers, bars pivotally connecting the corresponding ends of the levers, means for transmitting the movement of each of the several keys to one of said bars, and intermediate mechanism between said bars and the computing and indicating mechanism.

14. A device of the kind described, consisting of a plurality of numerical orders, each order comprising computing and indicating mechanism, a series of controlling keys therefor, means for rendering all other keys of the series inoperative during the operation of any one of their number, means for locking the mechanism against reverse movement until an operated key completes its stroke, and means for carrying from a lower to a higher order, in combination with a pair of bell crank levers, bars pivotally connecting the corresponding ends of said levers, means for transmitting the movement of each of the several keys to one of said bars, intermediate mechanism between the bars and the computing and indicating mechanism, and means for returning said bell crank levers and their associated parts to their normal positions.

15. A device of the kind described, consisting of a plurality of numerical orders, each order comprising computing and indicating mechanism, a series of controlling keys therefor, means for rendering all other keys in the series inoperative during the operation of any one of their number, means for locking the mechanism against reverse movement until the key operated completes its stroke, and means for carrying from a lower to a higher order, in combination with a pair of bell crank levers, bars pivotally joining the corresponding ends of said levers, means for transmitting the movement of each of the several keys to one of said bars, resilient intermediate mechanism between the bars and the computing and indicating mechanism, and resilient means for returning said bell crank levers and their associated parts to their normal positions.

16. In a computing machine or the like, a series of independently movable key actuated stops, and a series of movable keys therefor, in combination with locking mechanism for all stops remaining at normal position, and means for transmitting the movement of an operated key of the series to said locking mechanism after said key has actuated its stop, whereby all keys except that operated are locked.

17. In a computing machine or the like, a series of independently movable key actuated stops, and a series of movable keys therefor, in combination with locking mechanism for locking all stops remaining at normal position as well as the stop operated, and means for transmitting the movement of an operated key of the series to said locking mechanism after it has actuated its stop, whereby all keys except that operated are locked against movement, and the operated stop is locked in position until the cooperating mechanism has completed its movement.

18. In a computing machine or the like, a series of independently movable key actuated stops, and a series of movable keys therefor arranged to loosely engage said stops to actuate them, in combination with locking mechanism for all stops remaining at normal position, and means for transmitting the movement of an operated key of the series to said locking mechanism after the key has actuated its stop, whereby all keys except that operated are locked against movement.

19. In a computing machine or the like, a series of independently movable key actuated stops, and a series of movable keys therefor, arranged to loosely engage said stops to actuate them, in combination with locking mechanism for all the stops remaining at normal position and also for the operated stop, and means for transmitting the movement of an operated key of the series to said locking mechanism after the key has actuated its stop, whereby all keys except that operated are locked against movement, and the actuated stop is locked until the cooperating parts have completed their operation.

20. In a computing machine or the like, a series of independently movable key actuated stops, and a series of movable keys therefor, in combination with a longitudinally movable bar arranged to loosely engage and lock all stops remaining in normal position, and means for transmitting the movement of an operated key of the series to said locking bar after said key has actuated its stop, whereby all keys except that operated are locked against movement.

21. In a computing machine or the like, a series of independently movable key actuated stops, and a series of movable keys therefor, a longitudinally movable bar arranged to engage all stops when in their normal positions to lock them against movement, in combination with a pair of bell crank levers, bars pivotally joining corresponding ends of the levers, means for transmitting the movement of each of the several keys in a series to one of said bars, and means for transmitting the movements of the bars to actuate the longitudinally movable bar after the operated key has actuated its stop, whereby all the keys except that operated are locked against movement.

22. In a computing machine or the like, a series of independently movable key actuated stops, a series of movable keys therefor, and a longitudinally movable bar arranged to engage and lock a normally positioned stop against movement, in combination with a pair of bell crank levers, bars pivotally joining the corresponding ends of the levers, means for transmitting the movements of each of the several keys in a series to one of said bars, a lever pivotally supported between its ends with one end engaging the longitudinally movable bar and the other end provided with a cam face, and means carried upon one of said crank bars to engage said cam after the operated key has actuated its stop, whereby all keys except that operated are locked against movement.

23. In a computing machine or the like, a series of independently movable bell crank levers forming stops, and provided at one end with cam faces, a series of movable keys therefor each provided with a projecting part arranged to loosely engage said cam face, in combination with a longitudinally movable bar arranged to engage all normally positioned stops and means for transmitting the movement of an operated key of the series to move said locking bar after the key has actuated its stop, whereby all keys except that operated are locked.

24. In a device of the kind described, computing and indicating mechanism, a series of independently movable keys therefor, locking mechanism for all stops remaining in normal position, and means for transmitting the movement of an operated key of the series to said locking mechanism after the key has actuated its stop, in combination with a pair of bell crank levers, bars pivotally joining the corresponding ends of the levers, means for transmitting the movement of each of the several keys in the series to one of said bars, a coöperating longitudinally movable stop bar arranged in the line of the movable stops, and intermediate mechanism between said stop bar and the computing and indicating mechanism.

25. In a device of the kind described, computing and indicating mechanism, a series of independently movable key actuated stops, a series of movable keys therefor, a longitudinally movable lock bar arranged to engage the normally positioned stops, and means for transmitting the movement of an operated key of the series to said lock bar after the key has actuated its stop, in combination with a pair of bell crank levers, bars pivotally joining the corresponding ends of the levers, means for transmitting the movements of each of the several keys in the series to one of said bars, a longitudinally movable stop bar arranged in the plane of the movable stops and coöperating therewith, and resilient intermediate mechanism between the stop bar and the computing and indicating mechanism.

26. In a device of the kind described, a series of independently movable key actuated stops, a series of movable keys therefor, a longitudinally movable lock bar arranged to engage the normally positioned stops, and means for transmitting the movement of an operated key of the series to said lock bar after the key has actuated its stop, in combination with a pair of bell crank levers, bars pivotally joining the corresponding ends of the levers, means for transmitting the movement of each of the several keys of the series to one of said bars, intermediate mechanism between the connecting bars and the computing and indicating mechanism, a stop bar arranged in the plane of the movable stops, and controlling mechanism arranged between the stop bar and the computing mechanism.

27. In a device of the kind described, computing and indicating mechanism, a rotatable driving member therefor, and an actuating member loosely engaging said member to drive it in one direction only, in combination with a series of controlling keys, means for transmitting the movement of each of the keys to the actuating member, a variably movable member governed in its operation by the particular key operated, and a movable limiting stop for the actuating member governed by the said movable member.

28. In a device of the kind described, computing and indicating mechanism, a rotatable driving member therefor, and an actuating member loosely engaging said member to drive it in one direction only, in combination with a series of controlling keys, means for transmitting the movement of each of the keys to the actuating member, a variably movable member, means for regulating the movement of said member by the particular key operated; and a movable limiting stop for the actuating member connected to and governed by said movable member.

29. In a device of the kind described, computing and indicating mechanism, a rotatable driving member therefor, and an actuating member loosely engaging said member to drive it in one direction only, in combination with a series of controlling keys, means for resiliently transmitting the movement of each of the keys to the actuating member, a variably movable member, means for regulating the movement of said variably movable member governed by the particular key operated, and a movable limiting stop for the actuating member connected to and governed by said movable member.

30. In a device of the kind described, computing and indicating mechanism, a rotatable driving member therefor, and an actuating member loosely engaging said member to drive it in one direction only, in combination with a pair of bell crank levers, bars pivotally joining the corresponding ends of the levers, a series of controlling keys, means for transmitting the movement of each of the several keys in the series to one of said bars, resilient intermediate mechanism between the bars and the actuating member, a variably movable member, means for regulating the movement of said member governed by the particular key operated, and a movable limiting stop for the actuating member connected to and governed by said movable member.

31. In a device of the kind described, computing and indicating mechanism, a rotatable driving member therefor, and an actuating member loosely engaging said member to drive it in one direction only, in combination with a pair of bell crank levers, bars pivotally joining the corresponding ends of the levers, a series of controlling keys, means for transmitting the movement of each of the several keys in the series to one of said bars, resilient intermediate mechanism between the bars and the actuating member, a variably movable member, means for regulating the movement of said member governed by the particular key operated, and a movable limiting stop for the actuating member connected to and governed by said movable member.

32. In a device of the kind described, computing and indicating mechanism, a rotatable driving member therefor, and an actuating member loosely engaging said member to drive it in one direction only, in combination with a series of independently movable key actuated stops, a series of movable keys therefor, locking mechanism for all stops remaining in their normal position, means for transmitting the movement of an operated key of the series to said locking mechanism after it has actuated its stop, and means for transmitting the movement of said operated key to the actuating members.

33. In a device of the kind described, computing and indicating mechanism, a rotatable driving member therefor, and an actuating member loosely engaging said member to drive it in one direction only, in combination with a series of independently movable key actuated stops, a series of movable keys therefor, locking mechanism for all stops remaining in their normal positions, means for transmitting the movement of an operated key of the series to said locking mechanism after the key has actuated its stop, and also for transmitting the movement of said key to the actuating member, a variably movable member, means for transmitting the operation of the key to said movable member, and a movable limiting stop for the actuating member governed by said movable member.

34. In a device of the kind described, a rotatable driving member, an actuating member loosely engaging said member to drive it in one direction only, a series of controlling keys, and means for transmitting the movement of each one of the keys to the actuating member, in combination with a variably movable part, means for regulating the movements thereof governed by the particular key operated, and a movable limiting stop for the actuating member controlled by said movable member.

35. Controlling means for devices of the kind described, comprising a rotatable driving member, an actuating member loosely engaging said member to drive it in one direction only, and means for reciprocating said actuating member, in combination with a movable stop arranged in the path of the actuating member, means for regulating the position of said stop, a plurality of controlling keys, and intermediate mechanism between the several keys and the regulating mechanism.

36. Controlling means for devices of the kind described, comprising a driving gear, an actuating pawl loosely engaging the periphery of said gear in one direction only, and means for reciprocating said pawl, in combination with a variably movable stop arranged in the path of said pawl, means for regulating the position of said stop, a plurality of controlling keys, and intermediate mechanism between the several keys and the regulating mechanism.

37. Controlling means for devices of the kind described, comprising a driving gear, an actuating pawl loosely engaging the periphery of said gear in one direction only, means for reciprocating said pawl, and means for preventing the reverse movement of said driving gear, in combination with a variably movable stop arranged in the path of said pawl, a plurality of controlling keys, means for regulating the position of said stop, and intermediate mechanism between the several keys and the regulating mechanism.

38. Controlling means for devices of the kind described, comprising a driving gear, an actuating pawl loosely engaging the periphery of said gear in one direction only, means for reciprocating the pawl, and means for preventing the reverse movement of said driving gear, in combination with a variably movable stop arranged in the path of said pawl and adapted to wedge the same against the periphery of the gear, a plurality of controlling keys, means for regulating the position of said stop, and intermediate mechanism between the several keys and the regulating mechanism, whereby the driving gear is driven a predetermined distance, and is then positively locked against overthrow.

39. Controlling means for devices of the kind described, comprising a driving gear, an actuating pawl loosely engaging the periphery of said gear in one direction only, means for reciprocating said pawl, and means for preventing the reverse movement of said driving gear, in combination with a variably movable stop arranged in the path of said pawl, a plurality of controlling keys, a plurality of stops one of which is set up by the operation of the particular key, a longitudinally movable bar provided with graduated shoulders coöperating with the stops, and means connecting said stop bar with the movable gear stop.

40. In a computing machine, a series of operating keys, a driving member, a coöperating pawl for said member means for operating said pawl, a movable stop arranged in the path of the pawl, and a limiting bar secured to said stop, in combination with a series of movable stops corresponding with the keys, adapted to engage the limiting bar at varying points of its movement, and means for transmitting the movements of each of the several keys to operate its stop.

41. In a computing machine, a plurality of controlling key, a driving member, an actuating pawl for said driving member, a movable stop arranged in the path of the pawl adapted to wedge the same against the driving member, and a limiting bar secured to said stop, in combination with a plurality of movable stops corresponding with the number of keys, and adapted to engage the limiting bar at varying points of its movement, and intermediate mechanism between each key and its coöperating stop.

42. In a device of the kind described, a plurality of numerical orders, each order being provided with a plurality of controlling keys, a driving member for each order, an actuating pawl for said driving member, a movable stop arranged in the path of the pawl and adapted to wedge the pawl against the driving member to prevent overthrow, and a limiting bar secured to said stop, in combination with a movable stop for each key adapted to engage the limiting bar at varying points of its movement, means for transmitting the movement of the key to its individual stop, and means for carrying from a lower to a higher order.

43. In a computing machine, a plurality of controlling keys, a rotatable driving member, an actuating pawl for said rotatable member, and means for actuating said pawl, in combination with a movable stop arranged in the path of the pawl to arrest the movement of the same and lock the driving member against further movement at variable points in its rotation and intermediate mechanism between the several keys and the actuating pawl.

44. In a computing machine, a rotatable driving member, an actuating pawl therefor, and a motor spring for actuating said pawl, in combination with a plurality of controlling keys, means for transmitting the movement of each of the several keys to energize said motor spring, and stop mechanism regulated by the individual key operated to regulate the movement of said driving member.

45. In a computing machine, a rotatable driving member, an actuating pawl therefor, and a motor spring for actuating said pawl normally without tension, in combination with a plurality of controlling keys, means for transmitting the movement of any one of the keys to tension said spring, stop mechanism, and means for transmitting the movement of any of the keys operated to actuate said stop mechanism.

46. In a computing machine, a rotatable driving member, an actuating pawl therefor, and a motor spring for actuating said pawl, in combination with a movable stop arranged in the path of the pawl to arrest the movement of the same, a limiting bar secured to said stop, a plurality of keys, means for transmitting the movement of any one of the keys to energize said spring, and controlling mechanism between the several keys and the movable stops, whereby the operation of the driving member is limited by the particular key operated.

47. In a device of the kind described, a rotatable driving member, an actuating member loosely engaging said member to drive it in one direction only, a motor spring for actuating said member, a series of controlling keys, and means for transmitting the movement of each of the keys to energize said spring, in combination with a variably movable part, means for regulating the movements thereof governed by the particular key operated, and a movable limiting stop for the actuating member controlled by said movable member.

48. In a computing machine or the like, a series of independently movable key actuated stops, a series of movable keys therefor, mechanism for locking all stops remaining at normal position as well as the stop operated, and means for transmitting the movement of an operated key to said locking mechanism after the key has actuated its stop, in combination with a driving gear, an actuating pawl therefor, a motor spring for actuating said pawl, a variably movable stop arranged in the path of the actuating pawl, and a stop bar coöperating with the key stop and limiting the movement of the limiting stop, and means for transmitting the movement of any one of the keys of the series to energize the motor spring.

49. In a device of the kind described consisting of a plurality of numerical orders each provided with independent operating and driving mechanism, carrying mechanism therefor comprising an actuating wheel normally out of engagement with but intermittently engaging the indicating mechanism of its order to advance the same one interval, in combination with the driving mechanism of the next lower order, intermediate resilient mechanism between said driving mechanism and said actuating wheel, and escapement mechanism actuated by said driving mechanism controlling the intermittent operation of said actuating wheel.

50. In a device of the kind described consisting of a plurality of numerical orders each provided with indicating means and driving mechanism, carrying mechanism therefor comprising an actuating wheel normally out of engagement with but intermittently engaging the indicating mechanism of its order to advance the same one interval, and a pinion meshing with the actuating wheel, in combination with a rotating part operated by the driving mechanism of the next lower order, a resilient connection between said rotating part and the said pinion, and escapement mechanism also operated by the said driving mechanism and controlling the rotation of the actuating wheel.

51. In a device of the kind described consisting of a plurality of numerical orders each provided with indicating means and driving mechanism therefor, carrying mechanism comprising a ratchet wheel arranged to advance the indicator of its order, an actuating wheel normally out of engagement with but adapted to intermittently engage the ratchet wheel to advance it one interval, and a pinion meshing with the actuating wheel, in combination with a rotating part operated by the driving mechanism of the next lower order, a resilient connection between said rotating part and said pinion, and escapement mechanism also operated by said driving mechanism and controlling the operation of the actuating wheel.

52. In a device of the kind described consisting of a plurality of orders each provided with indicating means and driving mechanism therefor, carrying mechanism comprising a ratchet wheel in the indicating mechanism an actuating wheel provided with extending pins normally out of engagement with the ratchet wheel but upon rotation engaging the same to rotate it one interval and a pinion meshing with the ratchet wheel, in combination with a cam wheel rotated by the driving mechanism of the next lower order and having its periphery divided into substantially equal concentric cam faces, an escapement lever operated by the cam wheel and controlling the rotation of the actuating wheel and a coiled spring having one end secured to the cam wheel and the other to the said pinion.

In testimony whereof I have hereunto signed my name in the presence of two subscribing witnesses.

DANIEL W. SHIEK.

Witnesses:
BURTON U. HILLS,
CHARLES I. COBB.